US012129691B2

(12) United States Patent
Bajul et al.

(10) Patent No.: US 12,129,691 B2
(45) Date of Patent: Oct. 29, 2024

(54) EMERGENCY ACCESS DEVICE FOR A VEHICLE OPENING PANEL WITH ROTARY DEPLOYMENT ARM

(71) Applicant: VITESCO TECHNOLOGIES GMBH, Regensburg (DE)

(72) Inventors: Xavier Bajul, Toulouse (FR); Aurélien Leboeuf, Toulouse (FR); Nicolas Lefrancq, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 176 days.

(21) Appl. No.: 17/927,280

(22) PCT Filed: May 20, 2021

(86) PCT No.: PCT/EP2021/063503

§ 371 (c)(1),
(2) Date: Nov. 22, 2022

(87) PCT Pub. No.: WO2021/239580

PCT Pub. Date: Dec. 2, 2021

(65) Prior Publication Data

US 2023/0203853 A1 Jun. 29, 2023

(30) Foreign Application Priority Data

May 25, 2020 (FR) ........................................ 2005474

(51) Int. Cl.
*E05B 81/90* (2014.01)
*E05B 77/02* (2014.01)
(Continued)

(52) U.S. Cl.
CPC .............. *E05B 81/90* (2013.01); *E05B 77/02* (2013.01); *E05B 85/107* (2013.01); *E05B 79/20* (2013.01); *E05B 85/10* (2013.01)

(58) Field of Classification Search
CPC .......... E05B 81/90; E05B 77/02; E05B 85/10; E05B 85/107; E05B 79/20
See application file for complete search history.

(56) References Cited

U.S. PATENT DOCUMENTS 5,560,659 A * 10/1996 Dault ...................... E05B 85/18 292/336.3
6,102,454 A * 8/2000 Weyerstall ............. E05B 81/14 292/216
(Continued)

FOREIGN PATENT DOCUMENTS

CN 107780727 A 3/2018
CN 108999503 A 12/2018
(Continued)

OTHER PUBLICATIONS

International Search Report for PCT/EP2021/063503 dated Aug. 13, 2021, 5 pages.
(Continued)

*Primary Examiner* — Christine M Mills
*Assistant Examiner* — Faria F Ahmad
(74) *Attorney, Agent, or Firm* — NIXON & VANDERHYE

(57) ABSTRACT

Emergency access device for a vehicle opening leaf, having: a deployment arm that rotates between a first, retracted angular position and a second, deployed angular position; a graspable pull rod that is connected to a lock actuator and that has an end protruding from the deployment arm, the graspable pull rod being movable between a position attached to the deployment arm and a position detached from the deployment arm; a retention needle; an electric ejector; a mechanical ejector designed to release the deployment arm from its retracted position, the mechanical ejector
(Continued)

having a trigger designed to move the retention needle from its blocking position to its releasing position.

20 Claims, 12 Drawing Sheets

(51) Int. Cl.

*E05B 79/20* (2014.01)
*E05B 85/10* (2014.01)

(56) References Cited

U.S. PATENT DOCUMENTS

| | | | | |
|---|---|---|---|---|
| 7,108,301 | B2 * | 9/2006 | Louvel | E05B 85/103 292/201 |
| 10,487,548 | B2 | 11/2019 | Beck et al. | |
| 11,814,880 | B2 * | 11/2023 | Bajul | E05B 77/02 |
| 11,834,872 | B2 * | 12/2023 | Guerin | E05B 81/90 |
| 11,851,920 | B2 * | 12/2023 | Peterson | E05B 85/103 |
| 2018/0038140 | A1 * | 2/2018 | McCarthy | E05B 79/20 |
| 2019/0169889 | A1 | 6/2019 | Beck | |
| 2019/0283555 | A1 * | 9/2019 | Couto Maquieira | E05B 85/107 |
| 2020/0102773 | A1 * | 4/2020 | Sobecki | E05B 85/107 |
| 2021/0156174 | A1 * | 5/2021 | Kalesse | E05B 77/12 |
| 2021/0332620 | A1 | 10/2021 | Rhein | |
| 2022/0056740 | A1 * | 2/2022 | Sommer | E05B 83/36 |
| 2022/0136289 | A1 * | 5/2022 | Guerin | E05B 81/90 70/279.1 |

FOREIGN PATENT DOCUMENTS

| | | | | | |
|---|---|---|---|---|---|
| CN | 109944512 | A | | 6/2019 | |
| DE | 19627246 | A1 | | 1/1997 | |
| DE | 10324890 | A1 | * | 12/2004 | E05B 77/02 |
| DE | 102007047258 | A1 | * | 4/2009 | E05B 77/36 |
| DE | 102017101421 | A1 | | 7/2018 | |
| EP | 3 020 892 | | | 5/2016 | |
| EP | 3 020 892 | A1 | | 5/2016 | |
| FR | 3 075 846 | | | 6/2019 | |
| FR | 3 075 846 | A1 | | 6/2019 | |
| WO | WO-2015062586 | A1 | * | 5/2015 | E05B 77/02 |

OTHER PUBLICATIONS

Written Opinion of the ISA for PCT/EP2021/063503 dated Aug. 13, 2021, 6 pages.

Office Action, issued in Chinese Patent Application No. 202180037693 dated Feb. 23, 2024.

* cited by examiner

EMERGENCY ACCESS DEVICE FOR A VEHICLE OPENING PANEL WITH ROTARY DEPLOYMENT ARM

CROSS-REFERENCE TO RELATED APPLICATIONS

This application is the U.S. national phase of International Application No. PCT/EP2021/063503 filed May 20, 2021 which designated the U.S. and claims priority to FR Patent Application No. 2005474 filed May 25, 2020, the entire contents of each of which are hereby incorporated by reference.

TECHNICAL FIELD

The invention relates to the automotive field and concerns an emergency access device associated with a vehicle opening leaf.

In order to allow access to a motor vehicle, for example, opening leaves such as the doors are provided with access devices. The most common access devices are handles that are mechanically connected to a lock such that actuation of the handle by the user actuates the lock and allows opening.

Furthermore, more advanced access devices currently exist in which no mechanical connection is required for normal operation of the access device. These devices generally have a sensor for sensing the presence of the user's hand. If the user is authorized to open the vehicle, for example if he or she is carrying a required fob, the vehicle then actuates an electric strike in the lock of the opening leaf and thus allows access to the vehicle.

These access devices allow a reduction in mass, bulk and cost and also greater comfort of use since no physical connection with the lock is necessary in normal operation. However, for safety reasons in particular, these access devices nevertheless require an emergency access device providing a mechanical connection with the lock of the opening leaf in the event of an emergency or of an electrical fault.

PRIOR ART

Vehicles provided with access devices having no mechanical connection between the handle of an opening panel and its lock in normal operation are known. These known devices have an emergency access device having a mechanical and retractable means for actuating the lock.

SUMMARY OF THE INVENTION

The object of the invention is to improve the emergency access devices of the prior art so as to allow opening, in the event of an emergency, of an opening leaf provided with an access device having no mechanical connection between the handle and the lock of the opening leaf.

To this end, the invention concerns an emergency access device for a vehicle opening leaf, having:

- a body;
- a deployment arm mounted so as to rotate on the body between a first, retracted angular position and a second, deployed angular position;
- a graspable pull rod that is connected to a lock actuator and that has an end protruding from the deployment arm, the graspable pull rod being movable between a position attached to the deployment arm and a position detached from the deployment arm;

- an elastic member that urges the deployment arm toward its deployed position;
- a retention needle that is movable between a position for blocking the deployment arm in its retracted position and a position for releasing the deployment arm;
- an electric ejector designed to release the deployment arm from its retracted position, the electric ejector having an electric actuator designed to move the retention needle from its blocking position to its releasing position;
- a mechanical ejector designed to release the deployment arm from its retracted position, the mechanical ejector having a trigger designed to move the retention needle from its blocking position to its releasing position.

The emergency access device according to the invention performs two separate functions, for example within a vehicle:

- in the event of the vehicle being in an accident, an opening leaf such as a door of the vehicle must be able to be opened from the outside by the emergency services.

The doors have generally been unlocked during the accident. The vehicle also controls the electric ejector of the emergency access device such that the pull rod is accessible. The opening leaf is thus ready to be opened manually from the outside by virtue of the mechanical connection provided by the pull rod that is ready to be grasped;

- in the event that the vehicle no longer has the necessary electrical energy (discharged battery, for example), the user can manually actuate the emergency access device such that the mechanical ejector releases the pull rod so that it can be actuated by the user.

The emergency access device according to the invention performs these two functions with a small number of parts, thus ensuring reduced bulk and costs and also increased reliability.

Specifically, the electric ejector has a single main part such as an electric actuator (an electromagnet, for example), and the mechanical ejector also has only a single main part, which is a trigger. These two ejectors cooperate with the same retention needle which is designed to block the deployment arm in its retracted position.

The emergency access device is thus sufficiently compact to be concealed in a hollow recess of a vehicle opening leaf handle, which does not have any movable mechanical parts other than this emergency access device. Although the emergency access device, in the retracted position, is thus concealed during normal operation of the vehicle, this device is, however, designed to protrude and be readily visible, outside its recess, when performing an emergency opening operation, and it is then in the deployed position.

The triggering of the emergency access device is simple and does not require any fine control maneuvers by the user. It may be sufficiently intuitive to be executed without any prior knowledge of the means for triggering the device, that is to say without any prior knowledge of the position or the mode for actuating the mechanical ejector.

Furthermore, the mechanical ejector does not have a surface or interface that is visible from the outside of the vehicle, surfaces which would then require attention in terms of appearance and touch, and which would therefore increase the cost of the emergency access device. In addition, without interfaces that are visible from the outside of the vehicle, there are no mechanical elements requiring work concerning the minimization of functional play between the movable parts which would be exposed, and which would therefore have to be protected from rain, frost, dust, or other external attacks that have to be taken into account in a critical application such as emergency opening for which operational security is an essential criterion.

The emergency access device according to the invention may have the following additional features, on their own or in combination:

the deployment arm passes through an angle of substantially 180° between its retracted angular position and its deployed angular position;

the deployment arm has a central through-orifice designed for the passage of the lock actuator;

the graspable pull rod is attached to an end of the deployment arm by detachable fastening means;

the deployment arm has a strike designed to receive the retention needle in its retracted position;

the deployment arm has a stop designed to cooperate with a stop surface of the trigger when the deployment arm is in its retracted position;

the trigger has a fork designed to move the retention needle from its blocking position to its releasing position;

the trigger has a slider which is movable in translation and to which the fork is attached;

the trigger has a protruding actuating tab;

the trigger has a cap disposed facing the graspable pull rod when the deployment arm is in the retracted position.

Another subject of the invention relates to a motor vehicle door comprising an emergency access device for a vehicle opening leaf as described above.

Another subject of the invention relates to a motor vehicle comprising an emergency access device for a vehicle opening leaf as described above.

PRESENTATION OF THE FIGURES

Further features and advantages of the invention will become apparent from the following non-limiting description, with reference to the appended drawings, in which.

Figure 12:
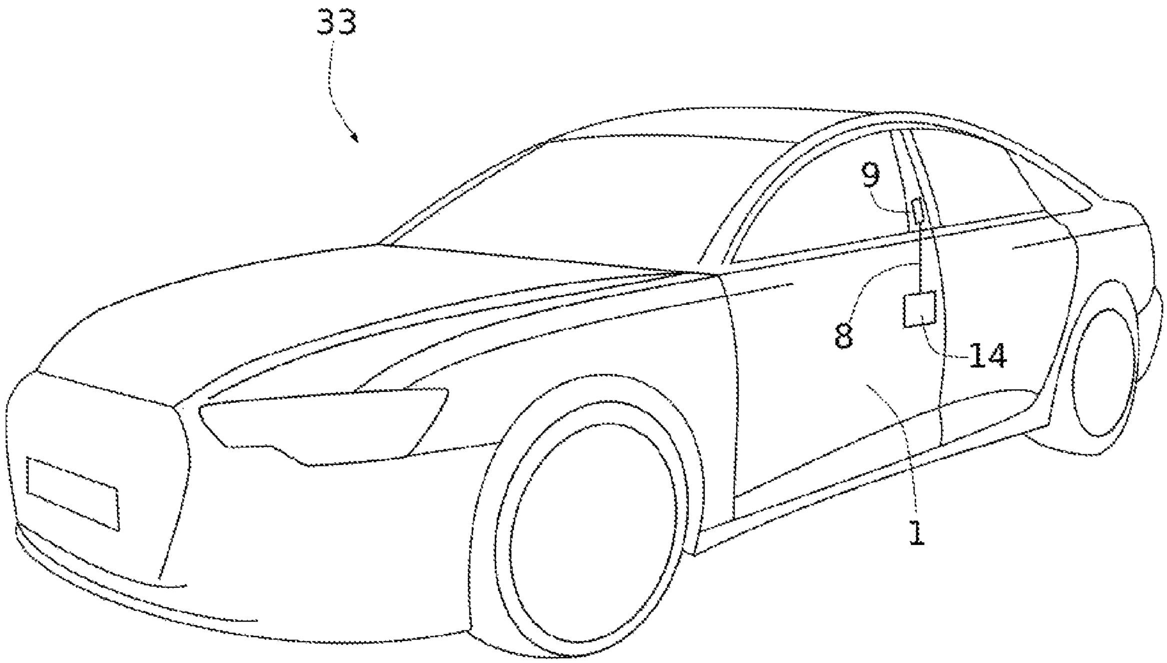

FIG. 12 schematically illustrates a motor vehicle, one of the opening leaves of which is equipped with an emergency access device according to the invention.

DETAILED DESCRIPTION

Figure 1:
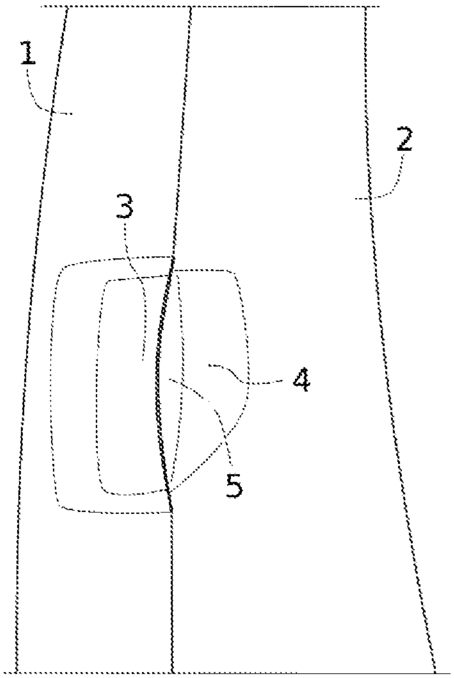
FIG. 1 illustrates a vehicle handle equipped with an emergency access device according to the invention.
Figure 2:
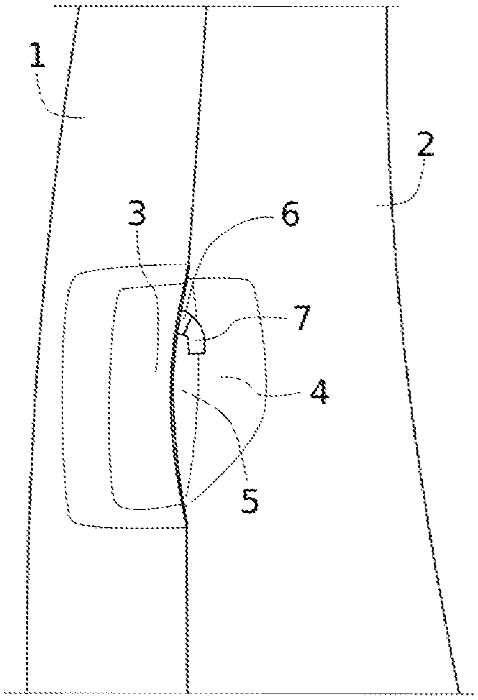
FIG. 2 illustrates the handle in FIG. 1 with the emergency access device in the triggered state.
Figure 3:
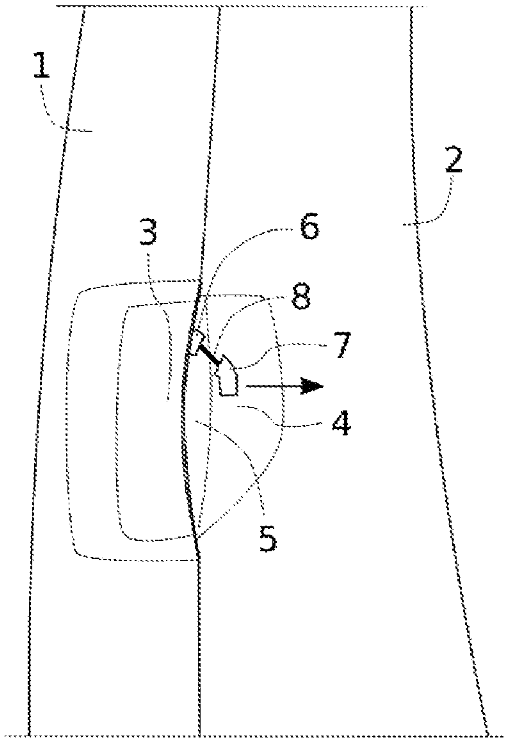
FIG. 3 illustrates the handle in FIG. 2 with the emergency access device in the course of manual unlocking.

FIGS. 1 to 3 illustrate the general operation of an emergency access device for a vehicle opening leaf according to the invention. These figures are partial views of the body of a vehicle showing an opening leaf 1 in a closed position with respect to a fixed part 2 of the vehicle.

The opening leaf 1 may be, for example, a door of the vehicle, the opening leaf of the trunk, or any other panel of the vehicle designed to be opened by the user. The opening leaf 1 has an opening handle 3 which forms, together with a corresponding portion 4 of the fixed part 2, a recess 5 designed to receive the hand of the user. The recess 5 may be produced, for example, by curving a part of the opening leaf 1 and/or by producing a concave portion in the fixed part 2.

According to the invention, the handle 3 is a handle with electric actuation which does not have any movable parts in motion during its normal operation. When the user wishes to unlock and open the opening leaf 1, they slide their hand into the recess 5. A sensor disposed inside the recess 5 detects the presence of the hand, thus leading to a control to unlock the locks of the vehicle and release the opening leaf 1. The user can then act on the handle 1 so as to open the opening leaf 1. The devices for detecting the hand of the user and the electrical means for controlling the locks are known from the prior art and will not be described in any more detail here.

Outside this normal operation, the handle 3 has an emergency access device which, in exceptional cases, reinstates direct mechanical actuation of the lock of the opening leaf 1 by the user. The emergency access device is disposed in the recess 5, on the opening leaf 1 or on the fixed part 2 as a function of the positioning of the lock to be controlled.

This emergency access device (not visible in FIGS. 1 to 3) makes it possible to manually unlock and open the opening leaf 1 in the event of a fault in the electrical system or in the event of an accident. In order to implement this emergency access device, starting from the closed-door position in FIG. 1, the user slides their hand into the recess 5 and manually triggers the emergency access device, thus leading to the release of a deployment arm 6 from the recess 5, as shown in FIG. 2. The deployment arm 6 is associated with a graspable pull rod 7 protruding at the end of the deployment arm 6. In FIG. 2, the graspable pull rod 7 is in a position attached to the deployment arm 6.

With reference to FIG. 2, the user then grasps the graspable pull rod 7 and pulls so as to bring the pull rod 7 into a position detached from the deployment arm 6 (see FIG. 3). The pulling on the graspable pull rod 7 leads to pulling on a lock actuator formed in this case of a cable 8. The cable 8 is attached to the corresponding lock of the vehicle and makes it possible to mechanically actuate this lock in the context of emergency access, in order to counteract the fault in the electrical opening means, or in the event of an accident.

Figure 4:
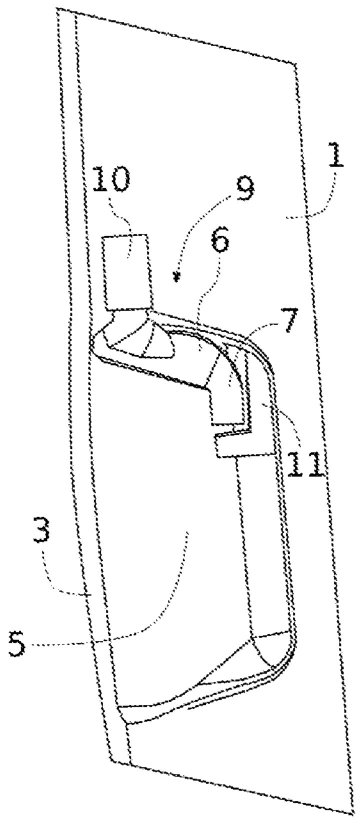
FIG. 4 illustrates the handle in FIG. 1 viewed from the interior.
Figure 5:
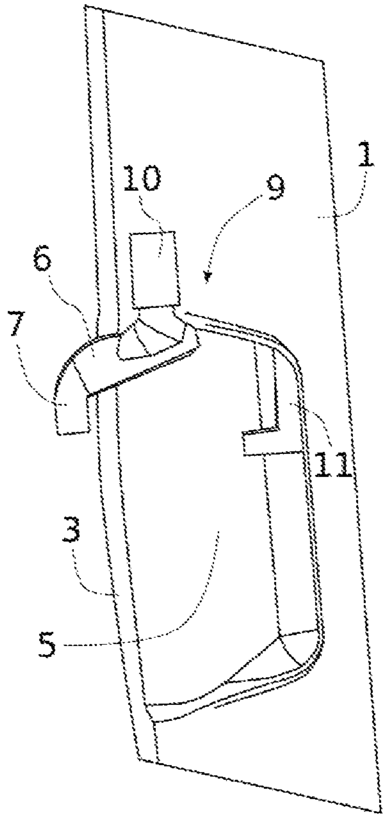
FIG. 5 illustrates the handle in FIG. 2 viewed from the interior.

FIGS. 4 and 5 illustrate the opening leaf 1 viewed from the interior and show the arrangement of the emergency access device 9 in the recess 5.

The emergency access device 9 has a pivot 10 allowing the deployment arm 6 to rotate between two extreme angular positions:

a retracted position, shown in FIG. 4, corresponding to the position in FIG. 1, in which position the emergency access device 9 has not been triggered. It is the normal use position of the vehicle, the opening leaf 1 being opened by virtue of the presence sensors for sensing the presence of the user's hand and the electrical opening means;

a deployed position, shown in FIG. 5, corresponding to the position in FIG. 2, in which position the emergency access device 9 has been triggered and the graspable pull rod 7 has thus been made available to the user who can perform the emergency opening by pulling the graspable pull rod 7.

In these two extreme angular positions, the deployment arm 6 is situated substantially in the same plane, that is to say that the deployment arm 6 passes through substantially 180° from the one to the other of these positions.

The emergency access device 9 also has a trigger 11 on which the user acts with their fingers so as to trigger the emergency access device 9.

Figure 6:
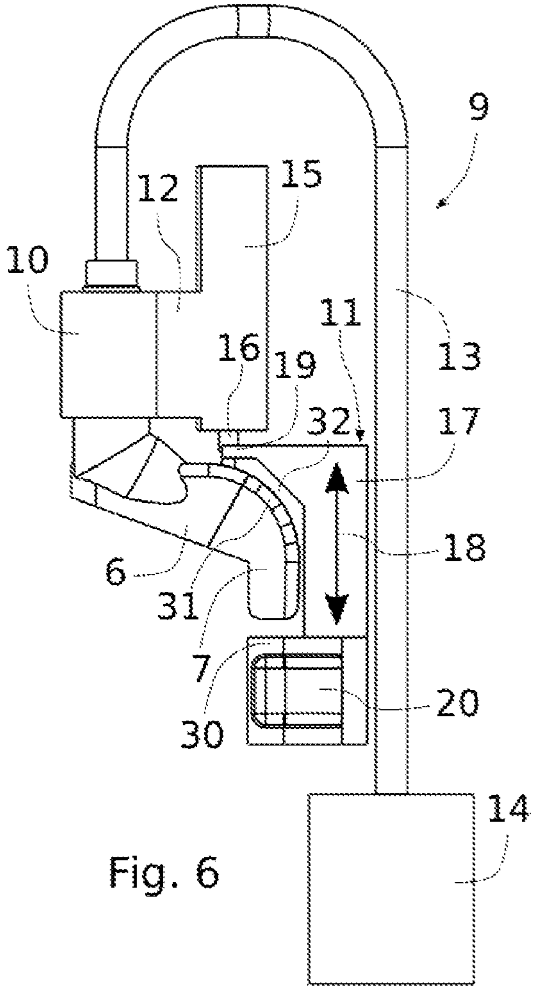
FIG. 6 shows an emergency access device according to the invention.
Figure 7:
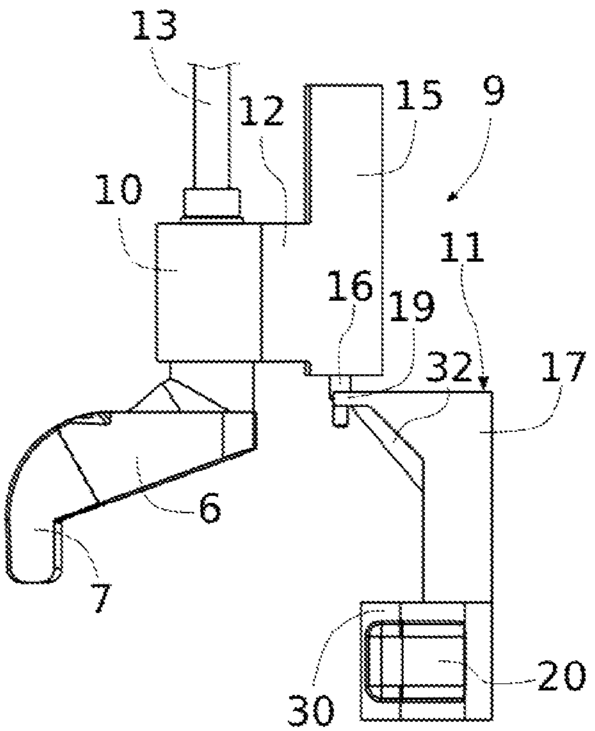
FIG. 7 shows the emergency access device in FIG. 6 in the triggered state.
Figure 8:
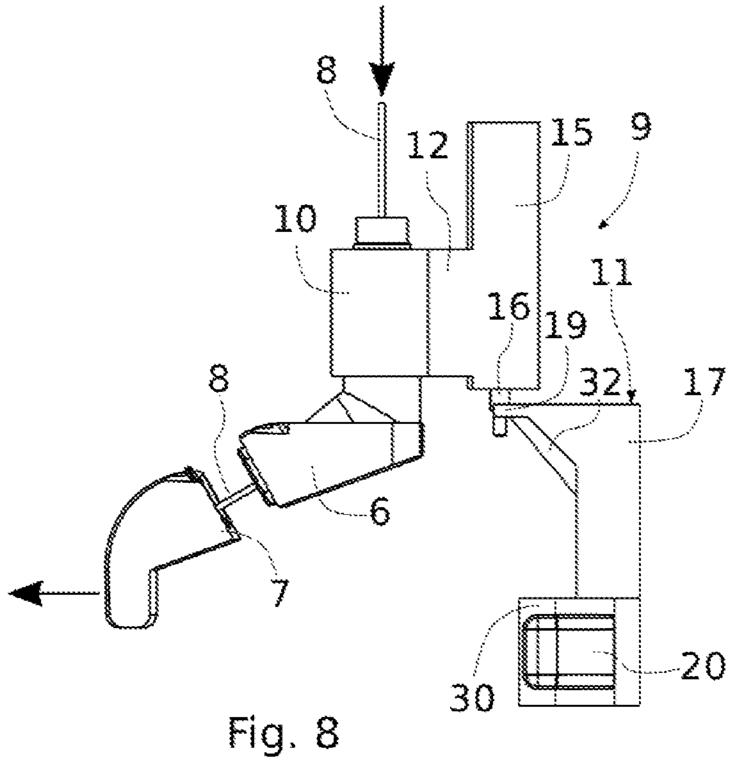
FIG. 8 shows the emergency access device in FIG. 7 in the course of manual unlocking.

FIGS. 6 to 8 show the emergency access device 9 alone in greater detail, viewed from the interior of the recess 5, in positions corresponding to FIGS. 1 to 3, respectively.

The emergency access device 9 has a body 12 forming a chassis receiving the various elements of the device. The pivot 10 is mounted on this body 12 and the deployment arm 6 is attached to the body 12 by the pivot 10. A sheath 13 bearing a cable 8 protrudes from the deployment arm 6 and is connected to the lock 14 which is controlled by the emergency access device 9. A retention needle 16 is movable in vertical translation with respect to the body 12 and is designed to be accommodated in the deployment arm 6 so as to keep the latter in its retracted position (FIG. 6). The needle 16 is thus movable between: a position for blocking the deployment arm 6 in its retracted position; and a position for releasing the deployment arm 6.

The emergency access device 9 has:

an electric ejector designed to release the deployment arm from its retracted position by an electric control. This electric ejector has an electric actuator 15 which is mounted on the body 12;

a mechanical ejector designed to release the deployment arm from its retracted position by a manual control on a trigger 11.

The trigger 11 of the mechanical ejector has in this case a slider 17, a fork 19 and an actuating tab 20 which are secured to one another. The slider 17 is movable in vertical translation (arrow 18 in FIG. 6) by virtue of a sliding connection which attaches it to the body 12 or directly to the opening leaf 1. The fork 19 is designed to lift the retention needle 16 when the slider 17 is moved upward in translation. The trigger 11 can thus control the passage of the needle 16 from its blocking position to its releasing position and thus trigger the emergency access device 9 by releasing the deployment arm 6.

The actuating tab 20 protrudes transversely with respect to the slider 17 and serves as a gripping interface for the user. During the triggering of the emergency access device 9, the user's fingers push the actuating tab 20 upward, thus moving the trigger 11 and its fork 19.

In the present example, the emergency access device 9 has elastic means that urge the deployment arm 6 toward its deployed position such that the actuation of the trigger 11, or of the electric actuator 15, releases these elastic means and causes the deployment arm 6 to pivot as far as its deployed position (FIG. 7).

FIG. 8 illustrates the pulling step which leads to the detachment of the graspable pull rod 7 and of the deployment arm 6, and which leads to the pulling of the cable 8 (shown without its sheath in FIG. 8).

Figure 9:
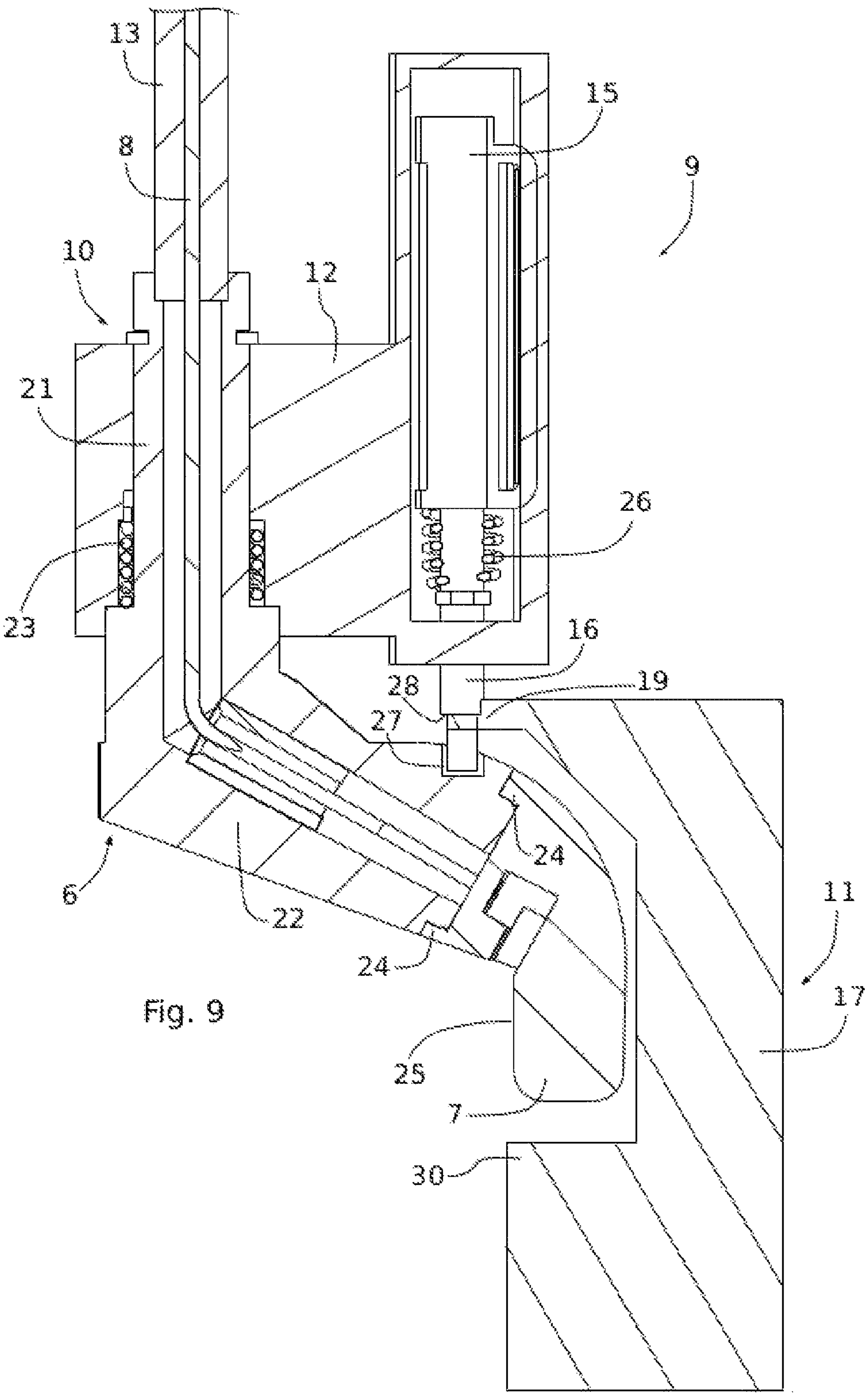
FIG. 9 is a view in section of the emergency access device in FIG. 6.

FIG. 9 shows the emergency access device 9 viewed in section, in its position in FIG. 6, and illustrates an exemplary embodiment in greater detail.

The deployment arm 6 is in this case formed of a pivot shaft 21 and of a transverse finger 22. The pivot shaft 21 and the transverse finger 22 are not coaxial, they form an angle of less than 180° between them, such that the rotation of the pivot shaft 21 leads to a movement of the transverse finger 22 as far as a position in which it protrudes far enough from the handle 3 to allow the user to grip the pull rod 7. Preferably, the angle between the pivot shaft 21 and the transverse finger 22 is close to a right angle, between 45° and 135°, for example.

The pivot shaft 21 is pivotably connected to the body 12, in a bore forming the pivot 10. The elastic means that urge the deployment arm 6 toward its deployed position are in this case formed by a torsion spring 23 disposed between the pivot shaft 21 and the body 12.

The deployment arm 6 has a central cylindrical orifice passing right through it and permitting the passage of the cable 8. The end of the cable 8 is fastened to the pull rod 7.

In the present example, the pull rod 7 is attached to the deployment arm 6 by detachable clipping means 24.

The pull rod 7 also has a pull surface 25 disposed substantially vertically, whereas the clipping means 24 are disposed in the continuation of the transverse finger 22 such that pulling on the surface 25 promotes the detachment of the pull rod 7.

The deployment arm 6 has a strike 27 formed in this case of an indentation in the transverse finger 22. When the needle 16 is in its blocking position, its end is inserted in the strike 27 and thus blocks the deployment arm 6 in its retracted position. Conversely, the removal of the needle 16 from the strike 27 releases the deployment arm 6 which immediately pivots toward its deployed position under the effect of the spring 23.

The electric actuator 15 of the electric ejector is in this case formed by an electromagnet that is movable in vertical translation and that is connected to the needle 16, and is designed to move the needle 16 between its blocking and releasing positions.

The trigger 11 of the mechanical ejector actuates the fork 19 which bears against a shoulder 28 of the needle 16, such that the lifting of the trigger 11 leads to the lifting of the needle 16 counter to a compression spring 26.

The trigger 11 has a cap 30 formed by a protruding heel of the slider 17 and disposed facing the pull rod 7 when the deployment arm 6 is in its retracted position. This cap 30 prevents pulling on the pull rod 7 while the deployment arm is still in the retracted position so as to prevent any accidental pulling on the pull rod 7 when the emergency access device has not been triggered. Thus, the user fumbling in the recess 5 can only encounter the activation tab 20 and can only trigger the emergency access device 9, without any risk of detaching the pull rod 7. This ensures that the emergency access device will be triggered only with the deployment arm 6 operational in the deployed position.

Figure 10:
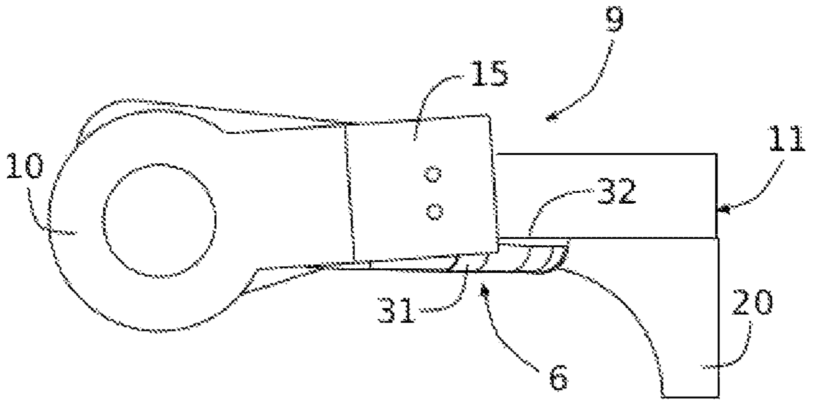
FIG. 10 is a top view of FIG. 6.
Figure 11:
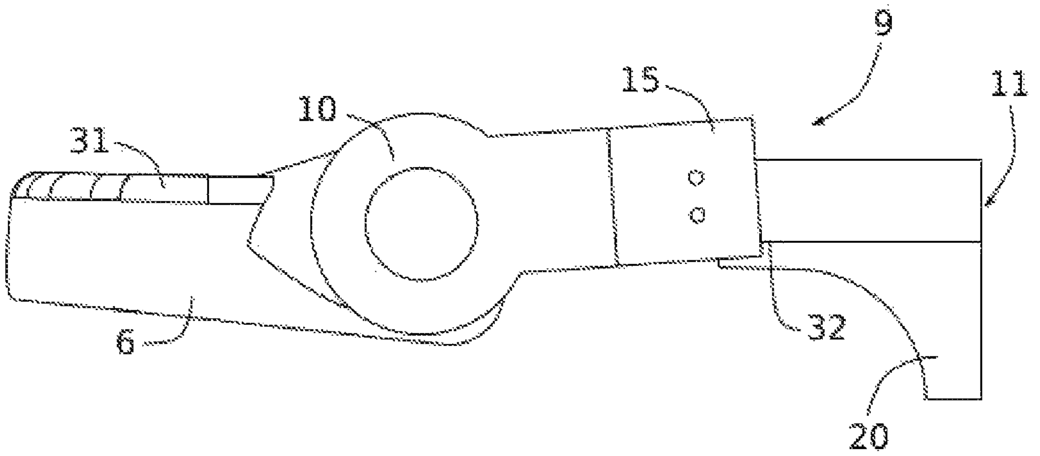
FIG. 11 is a top view of FIG. 7.

FIGS. 10 and 11 illustrate the emergency access device 9 in plan view, with the deployment arm 6 in the retracted position and in the deployed position, respectively. These plan views notably show the profile of the trigger 11. On this trigger 11, the slider 17 is a prismatic element, whereas the actuating tab 20 protrudes transversely with respect to the slider 17. The actuating tab 20 forms a thin and prominent element that is easily actuable by the fingers of the user. Although the emergency access device 9 is perfectly concealed inside the recess 5, its triggering is thus rapid and intuitive, even blindly by a user.

FIGS. 10 and 11 also show that the deployment arm 6 has a stop 31 formed in this case of a peripheral step, this stop being designed to come against a stop surface 32 of the slider 17 so as to define the extreme angular position of the deployment arm 6 corresponding to its retracted position.

FIG. 12 is a general view of a motor vehicle 33 equipped with the emergency access device 9 described above. The vehicle 33 is provided with an opening leaf 1 (which in this example is a door) having the lock 14 connected to the emergency access device 9 by the cable 8.

Variant embodiments of the emergency access device for a vehicle opening leaf may be implemented without departing from the scope of the invention. The emergency access device may for example be mounted on any movable or fixed part of the vehicle from which a lock could be actuated. The graspable pull rod 7 can be attached to the deployment arm 6 by any detachable fastening such as a magnet or elastic means.

Furthermore, the lock actuator 8 can be formed of any means suitable for mechanically actuating a lock, such as a rod, for example.

The electric actuator 15 of the electric ejector can furthermore be realized by any alternative means suitable for moving the needle 16 between its blocking and releasing positions, such as an electric motor, a bimetallic strip actuator or a piezoelectric actuator.

The invention claimed is:

1. An emergency access device for a vehicle opening leaf, comprising:

- a body;
- a deployment arm mounted so as to rotate on the body between a first, retracted angular position and a second, deployed angular position;
- a graspable pull rod that is connected to a lock actuator and that has an end protruding from the deployment arm, the graspable pull rod being movable between a position attached to the deployment arm and a position detached from the deployment arm;
- an elastic member that urges the deployment arm toward the deployment arm's second deployed angular position;
- a retention needle that is movable between a position for blocking the deployment arm in the deployment arm's first retracted angular position and a position for releasing the deployment arm;
- an electric ejector designed to release the deployment arm from the deployment arm's first retracted angular position, the electric ejector having an electric actuator designed to move the retention needle from the retention needle's position for blocking the deployment arm to the retention needle's position for releasing the deployment arm;
- a mechanical ejector designed to release the deployment arm from the deployment arm's first retracted angular position, the mechanical ejector having a trigger designed to move the retention needle from the retention needle's position for blocking the deployment arm to the retention needle's position for releasing the deployment arm.

2. The device as claimed in claim 1, wherein the deployment arm passes through an angle of substantially 180° between the deployment arm's first retracted angular position and the deployment arm's second deployed angular position.

3. The device as claimed in claim 1, wherein the deployment arm has a central through-orifice designed for the passage of the lock actuator.

4. The device as claimed in claim 1, wherein the graspable pull rod is attached to an end of the deployment arm by detachable fastening means.

5. The device as claimed in claim 1, wherein the deployment arm has a strike designed to receive the retention needle in the first retracted angular position.

6. The device as claimed in claim 1, wherein the deployment arm has a stop designed to cooperate with a stop surface of the trigger when the deployment arm is in its first retracted angular position.

7. The device as claimed in claim 1, wherein the trigger has a fork designed to move the retention needle from the retention needle's blocking position to the retention needle's position for releasing the deployemnt arm.

8. The device as claimed in claim 7, wherein the trigger has a slider which is movable in translation and to which the fork is attached.

9. The device as claimed in claim 1, wherein the trigger has a protruding actuating tab.

10. The device as claimed in claim 1, wherein the trigger has a cap disposed facing the graspable pull rod when the deployment arm is in the first retracted angular position.

11. A motor vehicle door, comprising an emergency access device for a vehicle opening leaf as claimed in claim 1.

12. A motor vehicle, comprising an emergency access device for a vehicle opening leaf as claimed in claim 1.

13. The device as claimed in claim 2, wherein the deployment arm has a central through-orifice designed for the passage of the lock actuator.

14. The device as claimed in claim 2, wherein the graspable pull rod is attached to an end of the deployment arm by detachable fastening means.

15. The device as claimed in claim 3, wherein the graspable pull rod is attached to an end of the deployment arm by detachable fastening means.

16. The device as claimed in claim 2, wherein the deployment arm has a strike designed to receive the retention needle in the first retracted angular position.

17. The device as claimed in claim 3, wherein the deployment arm has a strike designed to receive the retention needle in the first retracted angular position.

18. The device as claimed in claim 4, wherein the deployment arm has a strike designed to receive the retention needle in the first retracted angular position.

19. The device as claimed in claim 2, wherein the deployment arm has a stop designed to cooperate with a stop surface of the trigger when the deployment arm is in its first retracted angular position.

20. The device as claimed in claim 3, wherein the deployment arm has a stop designed to cooperate with a stop surface of the trigger when the deployment arm is in its first retracted angular position.

* * * * *